US012734929B2

(12) United States Patent
Tsuchiya et al.

(10) Patent No.: US 12,734,929 B2
(45) Date of Patent: Sep. 15, 2026

(54) SERVER

(71) Applicant: TOYOTA JIDOSHA KABUSHIKI KAISHA, Toyota (JP)

(72) Inventors: Yoshiyuki Tsuchiya, Nagoya (JP); Hiroto Nagaki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 748 days.

(21) Appl. No.: 18/134,733

(22) Filed: Apr. 14, 2023

(65) Prior Publication Data

US 2023/0331114 A1 Oct. 19, 2023

(30) Foreign Application Priority Data

Apr. 18, 2022 (JP) ................................ 2022-068342

(51) Int. Cl.

*H02J 7/00* (2026.01)
*B60L 53/62* (2019.01)
*B60L 53/66* (2019.01)
*B60L 53/68* (2019.01)

(52) U.S. Cl.

CPC ............... *B60L 53/68* (2019.02); *B60L 53/62* (2019.02); *B60L 53/665* (2019.02); *B60L 2210/40* (2013.01)

(58) Field of Classification Search

None

See application file for complete search history.

(56) References Cited

U.S. PATENT DOCUMENTS 11,264,825 B1 * 3/2022 Harris ..................... H02J 7/342
2012/0187759 A1 7/2012 Kamichi et al.
2015/0061569 A1 * 3/2015 Alexander ................ H02J 7/02 320/109
2018/0215278 A1 8/2018 Yabuuchi
2022/0305947 A1 * 9/2022 Wang ...................... B60L 53/67

FOREIGN PATENT DOCUMENTS

EP 2887016 A1 6/2015
JP 2017034938 A 2/2017

* cited by examiner

*Primary Examiner* — Arun C Williams

(74) *Attorney, Agent, or Firm* — Dinsmore & Shohl LLP

(57) ABSTRACT

A vehicle is configured such that a removable charging apparatus can be attached thereto. An external charging method includes a first charging method and a second charging method different from the first charging method. The first charging method is an external charging method performed while the charging apparatus is not attached to the vehicle. The second charging method is an external charging method performed by activation of the charging apparatus while the charging apparatus is attached to the vehicle. A server includes a processing apparatus and a storage. Tendency information representing a tendency of external charging is stored in the storage. The processing apparatus performs notification processing for notifying a user of recommendation for attachment or removal of the charging apparatus in accordance with the tendency information.

2 Claims, 16 Drawing Sheets

FIG.1

10
200
400
100
CHARGING APPARATUS
107 (110)
POWER STORAGE
105
250
251
FACILITY INFORMATION DATABASE
300
320

200
SERVER
210
PROCESSING APPARATUS
220
STORAGE
230
COMMUNICATION APPARATUS
140
HMI
170
COMMUNICATION APPARATUS
160
ECU
172
GPS
ES1
111
booster (DC/DC)
105
POWER STORAGE
110 (107)
120
PL3
130
100
124
122
115
DC
300 (320)
400
USER TERMINAL
410
CONTROLLER
420
HMI APPARATUS
430
COMMUNICATION APPARATUS 200
SERVER
210
PROCESSING APPARATUS
220
STORAGE
230
COMMUNICATION APPARATUS
140
HMI
170
COMMUNICATION APPARATUS
160
ES1
ECU
172
GPS
111
booster (DC/DC)
DCP
105
POWER STORAGE
110 (107)
120
PL3
130
100
124
122
EPDC
115
DC
300
400
USER TERMINAL
410
CONTROLLER
420
HMI APPARATUS
430
COMMUNICATION APPARATUS

FIG.6

| | | LOW IN DEGREE OF RECOMMENDATION RD1 FOR ATTACHMENT OF BOOSTER | ⟺ | HIGH IN DEGREE OF RECOMMENDATION RD1 FOR ATTACHMENT OF BOOSTER |
|---|---|---|---|---|
| 226A1 (226) | RATIO OF DC CHARGING FACILITY WITHIN ZONE OF LIVING (x1) | LOW | ⟺ | HIGH |
| 226B (226) | THE NUMBER OF 400V DC CHARGING FACILITIES (x2) | SMALL | ⟺ | LARGE |
| 226B (226) | THE NUMBER OF 800V DC CHARGING FACILITIES (x3) | LARGE | ⟺ | SMALL |
| 226C (226) | TRAVEL DISTANCE DURING MOST RECENT PERIOD (x4) | SHORT | ⟺ | LONG |
| 226D (226) | FREQUENCY OF FULL CHARGE (x5) | LOW | ⟺ | HIGH |
| 226E (226) | FREQUENCY OF EXTERNAL CHARGING IN HOUSE (x6) | HIGH | ⟺ | LOW |
| 226E (226) | FREQUENCY OF EXTERNAL CHARGING AT POINT DIFFERENT FROM HOUSE (x7) | LOW | ⟺ | HIGH |

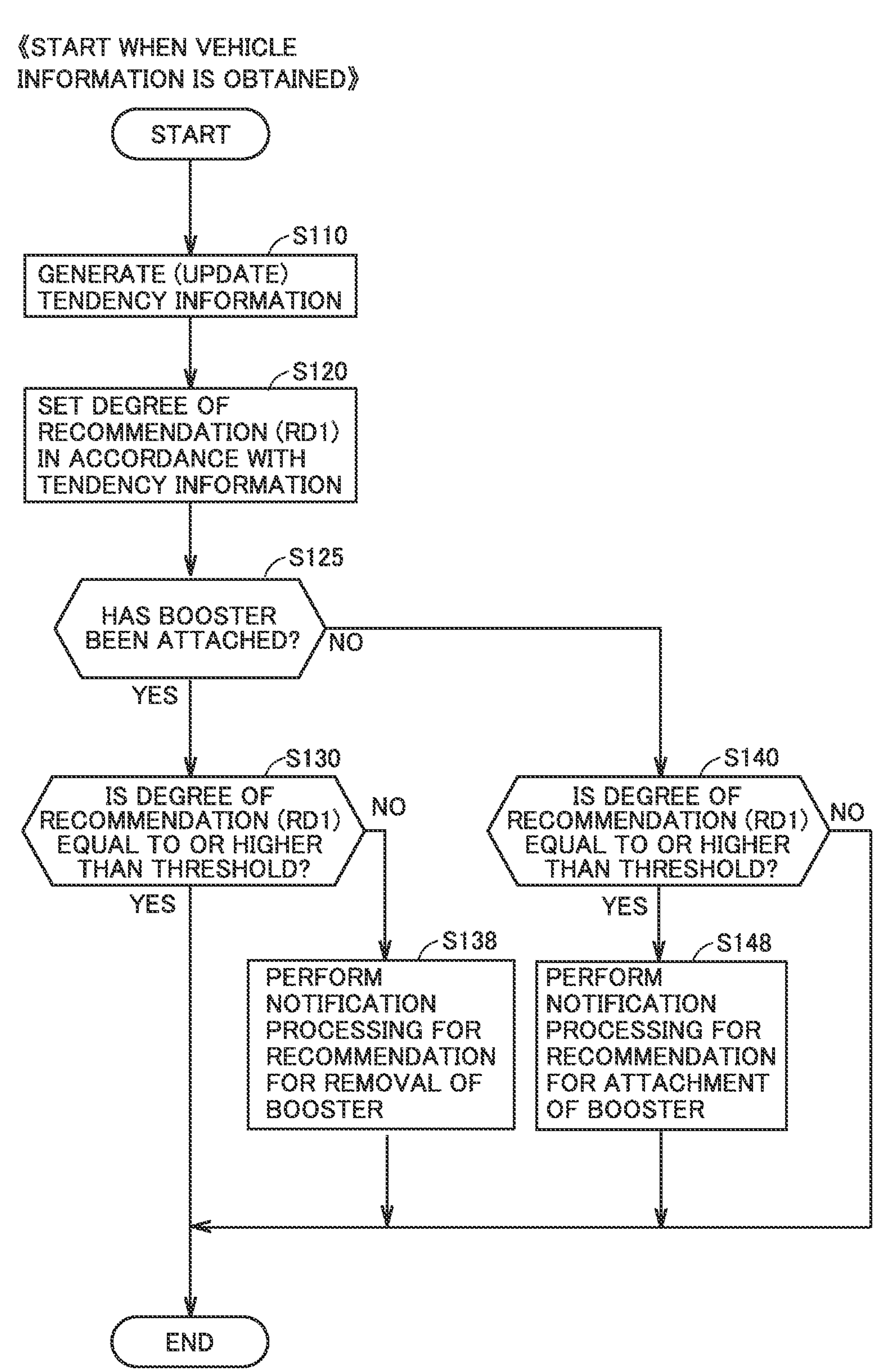
FIG.8
《START WHEN VEHICLE INFORMATION IS OBTAINED》
START
S110
GENERATE (UPDATE) TENDENCY INFORMATION
S120
SET DEGREE OF RECOMMENDATION (RD1) IN ACCORDANCE WITH TENDENCY INFORMATION
S125
HAS BOOSTER BEEN ATTACHED?
NO
YES
S130
IS DEGREE OF RECOMMENDATION (RD1) EQUAL TO OR HIGHER THAN THRESHOLD?
NO
YES
S140
IS DEGREE OF RECOMMENDATION (RD1) EQUAL TO OR HIGHER THAN THRESHOLD?
NO
YES
S138
PERFORM NOTIFICATION PROCESSING FOR RECOMMENDATION FOR REMOVAL OF BOOSTER
S148
PERFORM NOTIFICATION PROCESSING FOR RECOMMENDATION FOR ATTACHMENT OF BOOSTER
END 200
SERVER
210
PROCESSING APPARATUS
220
STORAGE
230
COMMUNICATION APPARATUS
140
HMI
170
COMMUNICATION APPARATUS
160
ECU
172
GPS
ES2
PL13
105
POWER STORAGE
112
132
AC/DC
185 (107)
PL12
100A
180
AC/DC
PL11
129
127
125
117
AC
350 (370)
400
USER TERMINAL
410
CONTROLLER
420
HMI APPARATUS
430
COMMUNICATION APPARATUS 200
SERVER
210
PROCESSING APPARATUS
220
STORAGE
230
COMMUNICATION APPARATUS
140
HMI
170
COMMUNICATION APPARATUS
160
ECU
172
GPS
ES2
DCPT
PL13
105
POWER STORAGE
112
AC/DC
132
100A
DCP12
185
PL12
AC/DC
ACP1
ACP2
DCP11
180
PL11
129
127
129
EPAC2
(EPAC)
117
400
USER TERMINAL
370
AC
410
CONTROLLER
420
HMI APPARATUS
430
COMMUNICATION APPARATUS

FIG.12

| | LOW IN DEGREE OF RECOMMENDATION RD2 FOR ATTACHMENT OF AC-DC CONVERSION DEVICE | ⇔ | HIGH IN DEGREE OF RECOMMENDATION RD2 FOR ATTACHMENT OF AC-DC CONVERSION DEVICE |
|---|---|---|---|
| 226A2 (226) RATIO OF AC CHARGING FACILITY WITHIN ZONE OF LIVING (x11) | LOW | ⇔ | HIGH |
| 226B (226) THE NUMBER OF 11kw AC CHARGING FACILITIES (x12) | LARGE | ⇔ | SMALL |
| 226B (226) THE NUMBER OF 22kw AC CHARGING FACILITIES (x13) | SMALL | ⇔ | LARGE |
| 226C (226) TRAVEL DISTANCE DURING MOST RECENT PERIOD (x4) | SHORT | ⇔ | LONG |
| 226D (226) FREQUENCY OF FULL CHARGE (x5) | LOW | ⇔ | HIGH |
| 226E (226) FREQUENCY OF EXTERNAL CHARGING IN HOUSE (x6) | HIGH | ⇔ | LOW |
| 226E (226) FREQUENCY OF EXTERNAL CHARGING AT POINT DIFFERENT FROM HOUSE (x7) | LOW | ⇔ | HIGH |

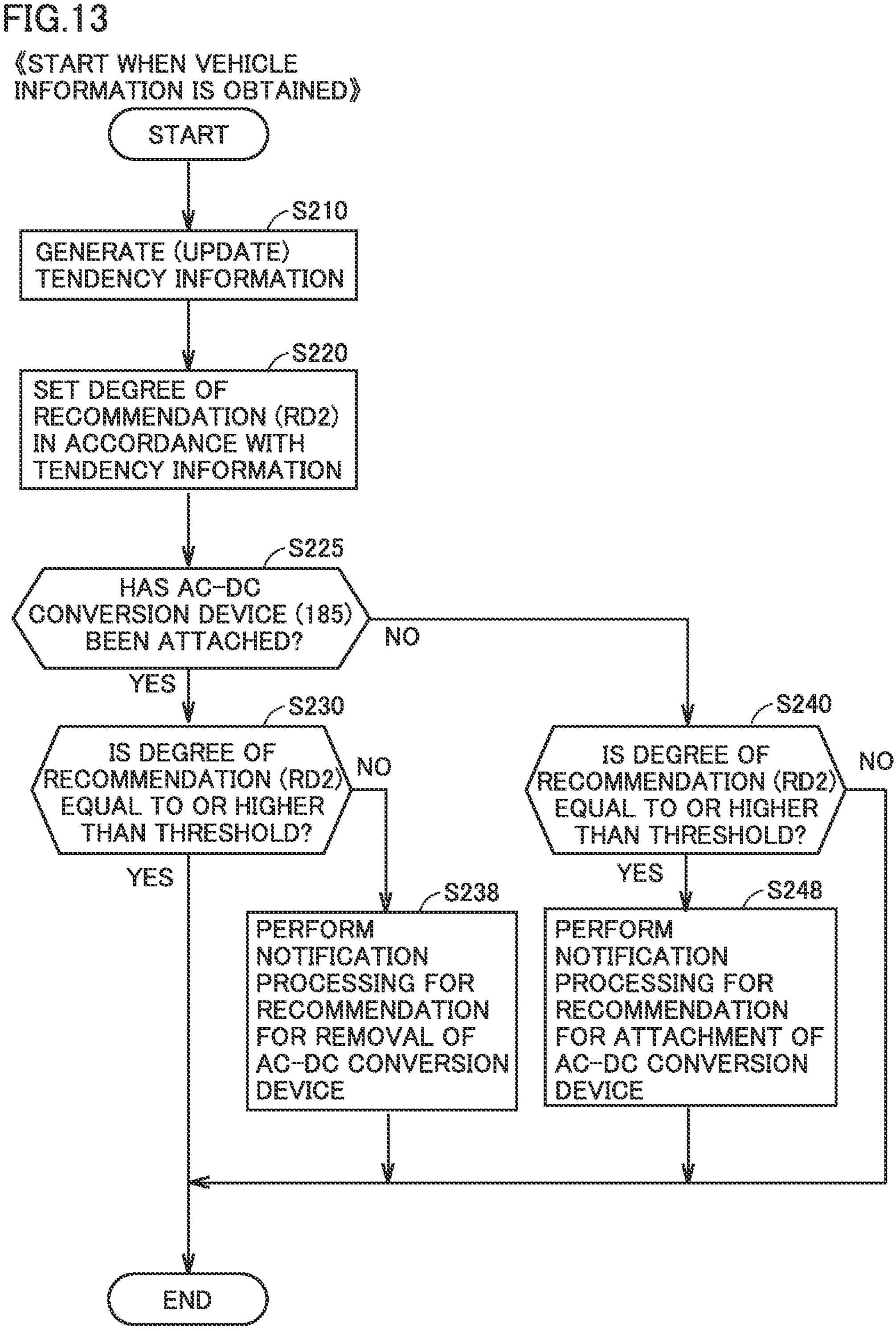
FIG.13
《START WHEN VEHICLE INFORMATION IS OBTAINED》
START
S210
GENERATE (UPDATE) TENDENCY INFORMATION
S220
SET DEGREE OF RECOMMENDATION (RD2) IN ACCORDANCE WITH TENDENCY INFORMATION
S225
HAS AC-DC CONVERSION DEVICE (185) BEEN ATTACHED?
NO
YES
S230
IS DEGREE OF RECOMMENDATION (RD2) EQUAL TO OR HIGHER THAN THRESHOLD?
NO
YES
S238
PERFORM NOTIFICATION PROCESSING FOR RECOMMENDATION FOR REMOVAL OF AC-DC CONVERSION DEVICE
S240
IS DEGREE OF RECOMMENDATION (RD2) EQUAL TO OR HIGHER THAN THRESHOLD?
NO
YES
S248
PERFORM NOTIFICATION PROCESSING FOR RECOMMENDATION FOR ATTACHMENT OF AC-DC CONVERSION DEVICE
END 10A
200
400
100 (100t)
CHARGING APPARATUS
107 (110)
POWER STORAGE
105
100
CHARGING APPARATUS
107 (110)
POWER STORAGE
105
1000
250
251
FACILITY INFORMATION DATABASE
300
320

140
HMI
170
COMMUNICATION APPARATUS
200
SERVER
400
USER TERMINAL
160
ECU
172
GPS
100B
PL13
105
POWER STORAGE
132
112
AC/DC
185
PL12
130
180
AC/DC
111
booster (DC/DC)
PL3
PL11
129
127
129
110
120
124
122
115
117
300 (320)
DC
350 (370)
AC

SERVER

CROSS REFERENCE TO RELATED APPLICATIONS

This nonprovisional application claims priority to Japanese Patent Application No. 2022-068342 filed with the Japan Patent Office on Apr. 18, 2022, the entire contents of which are hereby incorporated by reference.

BACKGROUND

Field

The present disclosure relates to a server and particularly to a server configured to notify a user of a vehicle in which a vehicle-mounted power storage is chargeable with electric power supplied from an electric power facility outside the vehicle.

Description of the Background Art

Japanese Patent Laying-Open No. 2017-34938 discloses a vehicle including a battery. This vehicle is configured to carry out external charging for charging the battery with electric power supplied from a charging stand outside the vehicle. The vehicle is configured to carry out external charging with a first charging method and configured such that a removable charging apparatus can be attached thereto. Attachment of this charging apparatus to the vehicle allows external charging with a second charging method different from the first charging method.

SUMMARY

Whether or not attachment of a removable charging apparatus to a vehicle is preferable may change after a user purchases the vehicle. Japanese Patent Laying-Open No. 2017-34938 does not particularly discuss a technique to ensure user's benefit even when such change occurs.

The present disclosure was made in view of the problem as above, and an object thereof is to provide a server that ensures user's benefit even when whether or not attachment of a removable charging apparatus to a vehicle is preferable changes after a user purchases the vehicle.

A server in the present disclosure is configured to notify a user of a vehicle that carries out external charging for charging a vehicle-mounted power storage with external electric power supplied from an electric power facility outside the vehicle. The vehicle is configured such that a removable charging apparatus can be attached thereto. A method of the external charging includes a first charging method and a second charging method different from the first charging method. The first charging method is the method of external charging carried out while the charging apparatus is not attached to the vehicle. The second charging method is the method of external charging carried out by activation of the charging apparatus while the charging apparatus is attached to the vehicle. The server includes a processing apparatus and a storage. Tendency information representing a tendency of the external charging is stored in the storage. The processing apparatus performs notification processing for notifying the user of recommendation for attachment or removal of the charging apparatus in accordance with the tendency information.

According to the configuration above, the user is motivated to attach or remove the charging apparatus. Thus, depending on the tendency of external charging of the vehicle, the charging apparatus is attached to or removed from the vehicle. Consequently, for example, attachment of the charging apparatus to the vehicle can improve convenience of the user of the vehicle. On the other hand, removal of the charging apparatus from the vehicle can allow effective use of the removed charging apparatus. Therefore, user's benefit can be ensured.

The tendency information may include information representing a frequency with which the external charging is carried out at a point different from a point determined in advance as a base of living of the user. The processing apparatus may perform the notification processing for more likely recommending attachment of the charging apparatus as the frequency is higher and may perform the notification processing for more likely recommending removal of the charging apparatus as the frequency is lower.

According to the configuration above, the frequency with which external charging is carried out at a point different from the point determined in advance can be reflected on notification processing.

The tendency information may include information representing a travel distance of the vehicle. The processing apparatus may perform the notification processing for more likely recommending attachment of the charging apparatus as the travel distance is longer and may perform the notification processing for more likely recommending removal of the charging apparatus as the travel distance is shorter.

According to the configuration above, the travel distance can be reflected on notification processing.

The tendency information may include information representing a frequency of full charge which is a frequency of charging of the vehicle-mounted power storage to a fully charged state during the external charging. The processing apparatus may perform the notification processing for more likely recommending attachment of the charging apparatus as the frequency of full charge is higher and may perform the notification processing for more likely recommending removal of the charging apparatus as the frequency of full charge is lower.

According to the configuration above, the frequency of full charge can be reflected on notification processing.

The tendency information may include information representing an area of activities of the user of the vehicle. The processing apparatus may perform the notification processing for more likely recommending attachment of the charging apparatus as the area of activities is larger and may perform the notification processing for more likely recommending removal of the charging apparatus as the area of activities is smaller.

According to the configuration above, the area of activities of the user can be reflected on notification processing.

The external electric power may be external direct-current (DC) power as DC power supplied from the electric power facility to the vehicle. The charging apparatus may be a booster configured to boost, when a voltage of the external DC power is a first voltage, the first voltage and to supply DC power at a second voltage which is the boosted voltage to the vehicle-mounted power storage. The first charging method may include a method of charging the vehicle-mounted power storage by supplying the external DC power at the second voltage from the electric power facility to the vehicle-mounted power storage when the voltage of the external DC power is the second voltage.

According to the configuration above, the booster can appropriately be attached to or removed from the vehicle.

Consequently, user's benefit can be ensured in an example where external electric power is external DC power.

The tendency information may include information representing the number of prescribed DC charging facilities (corresponding to an electric power facility 320 which will be described later) within a predetermined range including a base of living of the user. The prescribed DC charging facilities are each the electric power facility configured to supply the external DC power at the second voltage to the vehicle. The processing apparatus may perform the notification processing for more likely recommending attachment of the booster as the number of prescribed DC charging facilities is smaller and may perform the notification processing for more likely recommending removal of the booster as the number of prescribed DC charging facilities is larger.

According to the configuration above, the number of prescribed DC charging facilities can be reflected on the notification processing.

The external electric power may be external alternating-current (AC) power as AC power supplied from the electric power facility to the vehicle. The vehicle may include a first AC-DC conversion device for carrying out the external charging with the external AC power. The charging apparatus may be a second AC-DC conversion device different from the first AC-DC conversion device. The first charging method may include a method of charging the vehicle-mounted power storage by activation of the first AC-DC conversion device when the external AC power is first electric power. The second charging method may include a method of charging the vehicle-mounted power storage by activation of both of the first AC-DC conversion device and the second AC-DC conversion device when the external AC power is second electric power greater than the first electric power.

According to the configuration above, the second AC-DC conversion device can appropriately be attached to or removed from the vehicle. Consequently, user's benefit can be ensured in an example where external electric power is external AC power.

The tendency information may include information representing the number of prescribed AC charging facilities (corresponding to an electric power facility 370 which will be described later) within a predetermined range including a base of living of the user. The prescribed AC charging facilities are each the electric power facility configured to supply the external AC power at the second electric power to the vehicle. The processing apparatus may perform the notification processing for more likely recommending attachment of the second AC-DC conversion device as the number of prescribed AC charging facilities is larger and may perform the notification processing for more likely recommending removal of the second AC-DC conversion device as the number of prescribed AC charging facilities is smaller.

According to the configuration above, a ratio of the prescribed AC charging facilities can be reflected on the notification processing.

The processing apparatus may perform determination processing for determining whether or not attachment or removal of the charging apparatus in a subject vehicle is recommended in accordance with the tendency information of the subject vehicle by using a trained model. The trained model is a model trained with relation with total tendency information representing the tendency information of a plurality of the vehicles and total frequency information representing a total frequency which is a frequency with which the external charging is carried out with the second charging method in the plurality of vehicles. The subject vehicle is the vehicle to be subjected to the determination processing. The processing apparatus may perform the notification processing for notifying a user of the subject vehicle in accordance with a result of the determination processing.

The tendency information and the total frequency of the plurality of vehicles are reflected on the model to optimize the model. According to the configuration above, whether or not attachment or removal of the charging apparatus to and from the subject vehicle is recommended is determined with the use of the model. Consequently, processing for notifying the user of the subject vehicle can appropriately be performed.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 1 is a diagram showing a configuration of an information processing system including a server according to a first embodiment.

FIG. 6 is a diagram for illustrating relation between a degree of recommendation for attachment of the booster and tendency information.

FIG. 8 is a flowchart showing exemplary processing performed by the server according to the first embodiment.

FIG. 12 is a diagram for illustrating relation between a degree of recommendation for attachment of the AC-DC conversion device and tendency information.

FIG. 13 is a flowchart showing exemplary processing performed by the server according to the second embodiment.

DETAILED DESCRIPTION

Figure 2:
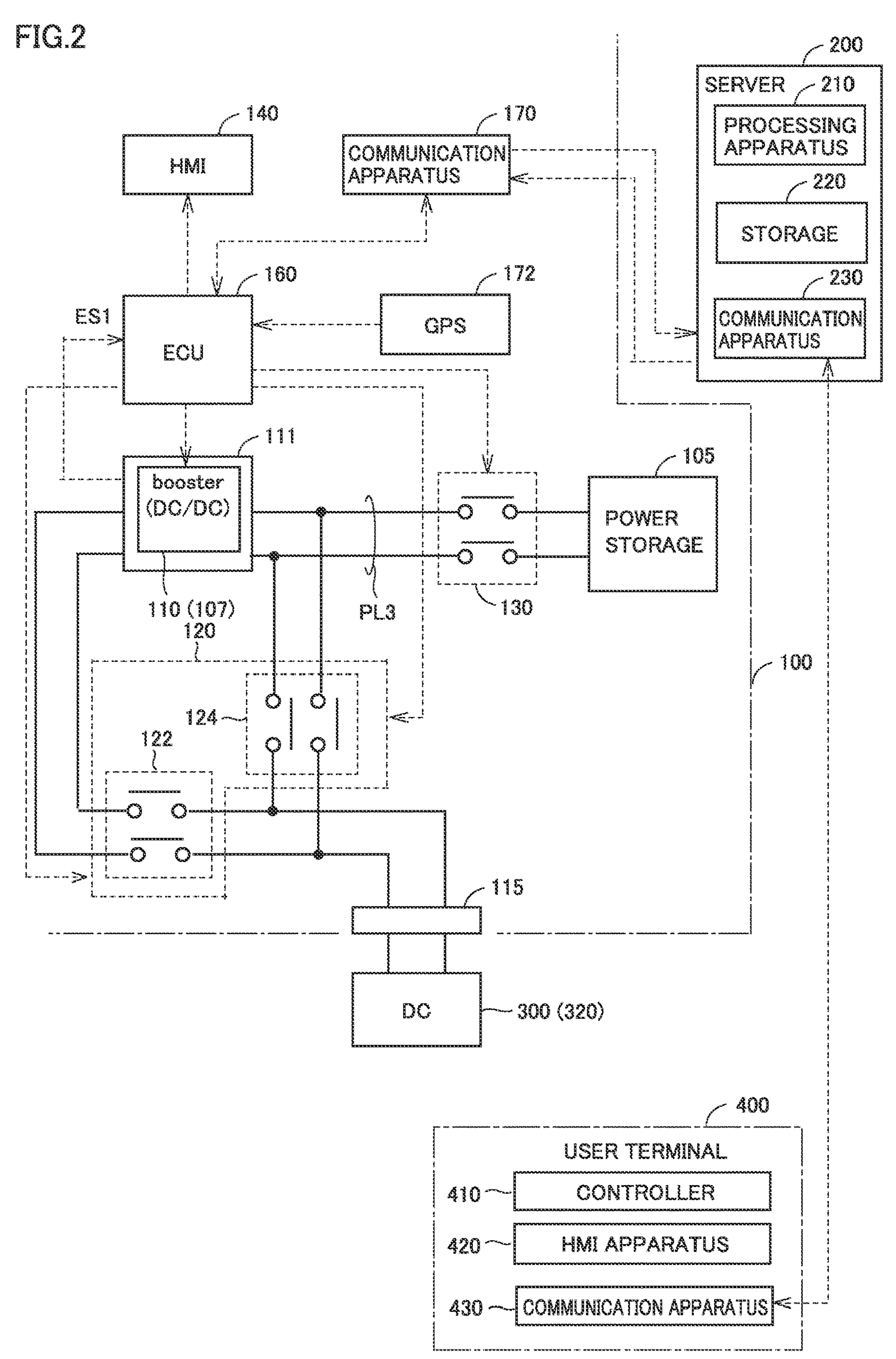
FIG. 2 is a diagram showing a detailed configuration of a vehicle, a user terminal, and the server.

An embodiment of the present disclosure will be described in detail below with reference to the drawings. The same or corresponding elements in the drawings have the same reference characters allotted and description thereof will not be repeated. The embodiments and modifications thereof may be combined as appropriate.

First Embodiment

Figure 1:
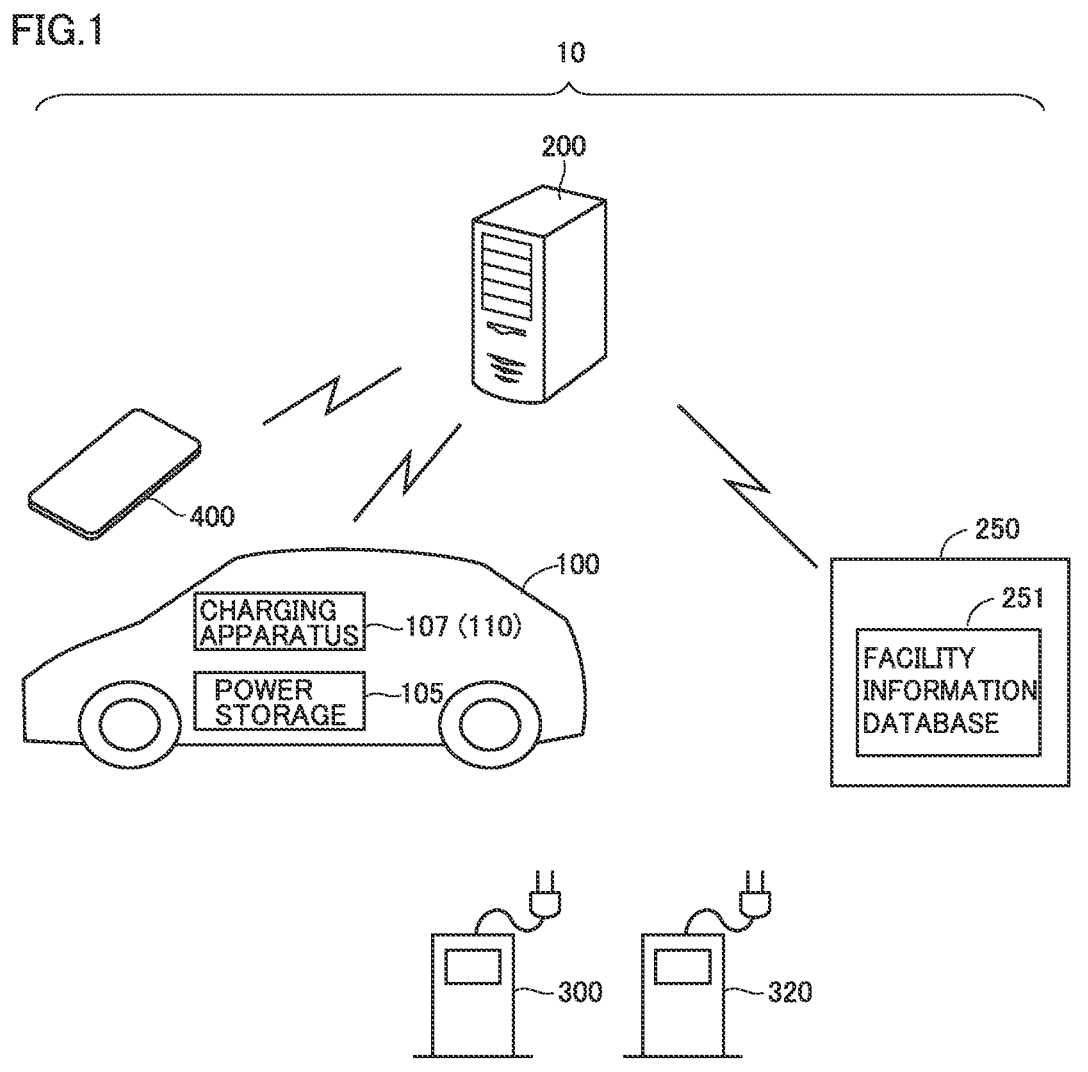

FIG. 1 is a diagram showing a configuration of an information processing system including a server according to a first embodiment. Referring to FIG. 1, an information processing system 10 includes a vehicle 100, a server 200, a user terminal 400, and a server 250.

Vehicle 100 is an electrically powered vehicle including a power storage 105. Electric power for travel of vehicle 100 is stored in power storage 105. In this example, a voltage of power storage 105 is 800 V. Vehicle 100 is configured to be able to carry out external charging for charging power storage 105 with external electric power. External electric power refers to electric power supplied from an electric power facility outside vehicle 100 (external electric power facility) to vehicle 100.

Electric power facilities 300 and 320 are external electric power facilities configured to supply external DC power at voltages of 400 V and 800 V to vehicle 100, respectively. External DC power is DC power as external electric power. External charging with external DC power is also referred to as DC charging. DC charging is distinguished from AC charging which is external charging for charging power storage 105 with AC power as external electric power (external AC power). External electric power facilities configured to supply external DC power and external AC power to vehicle 100 are also referred to as a DC charging facility and an AC charging facility, respectively.

Vehicle 100 is configured such that a removable charging apparatus 107 can be attached thereto. In this example, charging apparatus 107 is a booster 110 (a DC-DC converter). When external DC power at a voltage of 400 V is supplied from electric power facility 300 to vehicle 100, booster 110 boosts the voltage to 800 V and supplies electric power at the boosted voltage to power storage 105. Operations of booster 110 will be described in detail later.

In the description below, the method of external charging carried out while charging apparatus 107 (in this example, booster 110) is not attached to vehicle 100 is also referred to as a first charging method. On the other hand, a method of external charging carried out by activation of charging apparatus 107 while charging apparatus 107 is attached to vehicle 100 is also referred to as a second charging method.

Server 200 is configured to communicate with vehicle 100 and user terminal 400 for providing various types of information to a user of vehicle 100. User terminal 400 is a portable terminal operated by the user of vehicle 100.

Server 250 is configured to communicate with server 200, and a facility information database 251 is stored therein. Facility information database 251 contains various types of information (for example, an identification number, a position, and a specification of each electric power facility) of each of a plurality of external electric power facilities including electric power facilities 300 and 320. The specification includes information representing which of the DC charging facility and the AC charging facility each external electric power facility falls under and a voltage (V) and magnitude (kw) of external electric power. Facility information database 251 is used by being accessed by server 200.

FIG. 2 is a diagram showing a detailed configuration of vehicle 100, user terminal 400, and server 200. Referring to FIG. 2, in this example, booster 110 is attached to vehicle 100.

Vehicle 100 includes an interface 111, a DC inlet 115, a relay unit 120, and a system main relay (SMR) 130, in addition to power storage 105 and booster 110. Vehicle 100 further includes a human machine interface (HMI) apparatus 140, a communication apparatus 170, a global positioning system (GPS) receiver 172, and an electronic control unit (ECU) 160.

Interface 111 is a member in vehicle 100 to which booster 110 is attached. Interface 111 transmits to ECU 160, an attachment/non-attachment signal ES1 indicating whether or not booster 110 is attached. DC inlet 115 is configured to receive external DC power supplied from the DC charging facility such as electric power facility 300 or 320. Relay unit 120 includes charging relays 122 and 124. SMR 130 is provided between power storage 105 and a power line PL3. Power storage 105, booster 110, relay unit 120, and SMR 130 implement a vehicle-mounted charging system for DC charging at 800 V.

HMI apparatus 140 provides various types of information to the user of vehicle 100 or receives an operation by the user. Communication apparatus 170 is configured to communicate with server 200. GPS receiver 172 obtains positional information representing a current position of vehicle 100. ECU 160 controls each component of vehicle 100.

User terminal 400 includes an HMI apparatus 420, a communication apparatus 430, and a controller 410. HMI apparatus 420 provides various types of information to the user and accepts an operation by the user. Communication apparatus 430 is configured to wirelessly communicate with server 200. Controller 410 controls each component of user terminal 400.

Server 200 includes a processing apparatus 210, a storage 220, and a communication apparatus 230. Processing apparatus 210 includes a processor such as a central processing unit (CPU). Storage 220 includes a read only memory (ROM) and a random access memory (RAM). The RAM functions as a working memory. A program to be executed by processing apparatus 210 is stored in the ROM. Communication apparatus 230 is configured to bidirectionally communicate with a device (for example, vehicle 100 and user terminal 400) outside server 200.

Figure 3:
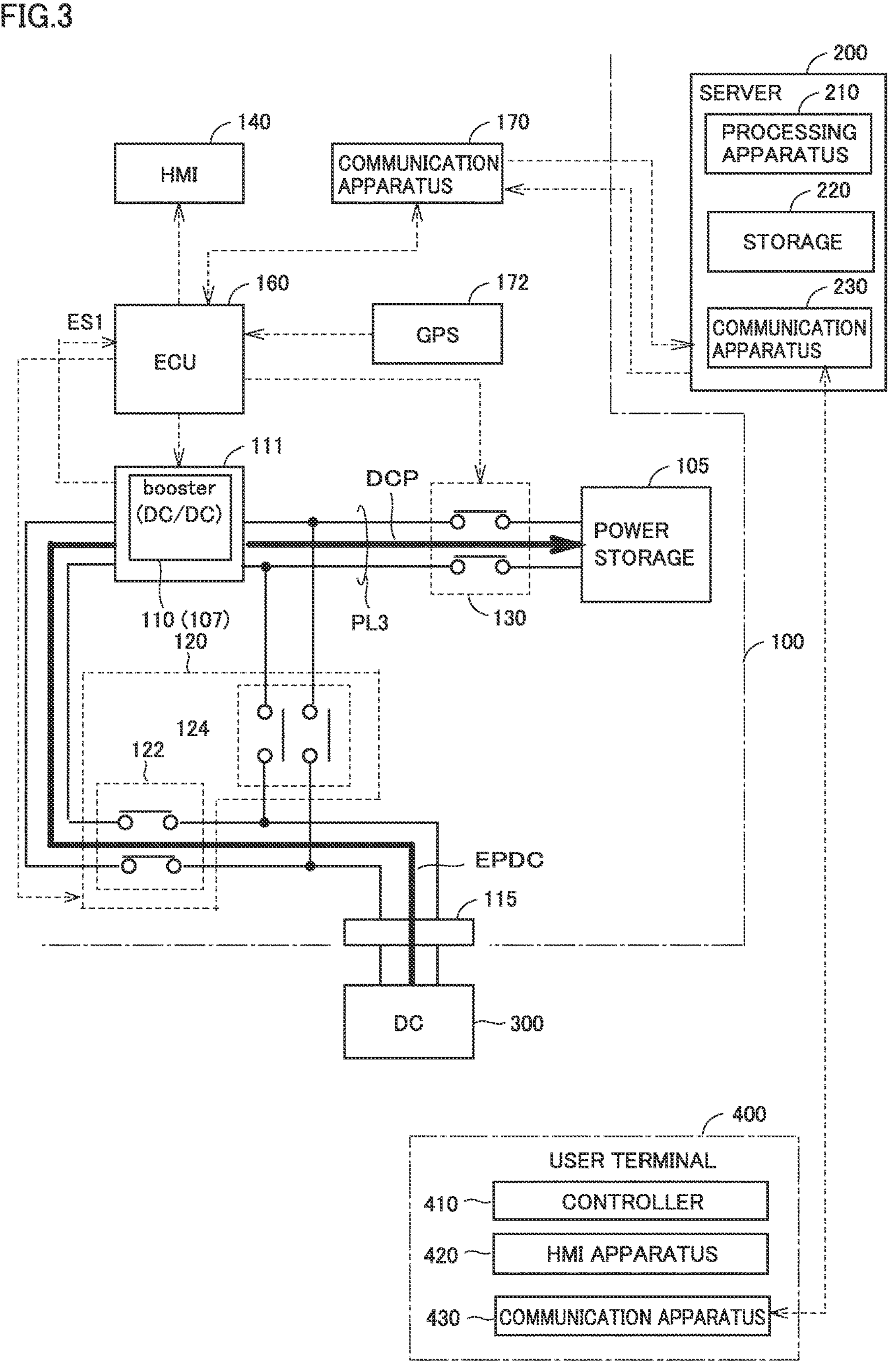
FIG. 3 is a diagram showing a flow of electric power in an example where a booster is attached to the vehicle and DC charging is carried out with the use of an electric power facility.

FIG. 3 is a diagram showing a flow of electric power in an example where booster 110 is attached to vehicle 100 and DC charging is carried out with the use of electric power facility 300. Referring to FIG. 3, when a voltage of external DC power EPDC is 400 V (the external electric power facility is electric power facility 300) as in this example, booster 110 boosts the voltage of external DC power EPDC from 400 V to 800 V. Then, booster 110 supplies DC power DCP at the boosted voltage (800 V) to power storage 105 so that power storage 105 is charged (second charging method).

Figure 4:
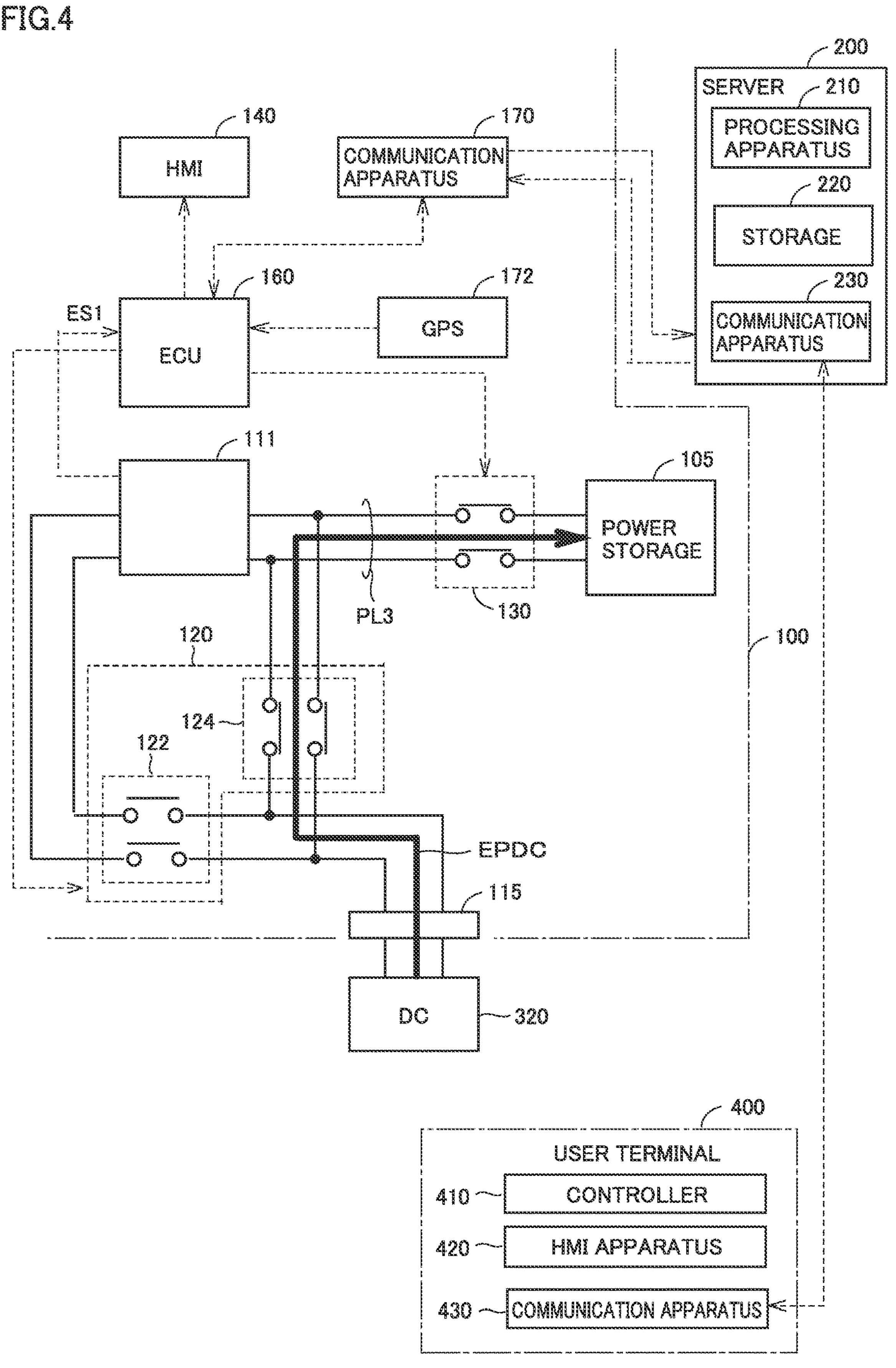
FIG. 4 is a diagram showing a flow of electric power in an example where a booster is not attached to the vehicle and DC charging is carried out with the use of an electric power facility.

FIG. 4 is a diagram showing a flow of electric power in an example where booster 110 is not attached to vehicle 100 and DC charging is carried out with the use of electric power facility 320. Referring to FIG. 4, external DC power EPDC at 800 V is directly supplied to power storage 105 through charging relay 124 and SMR 130. In other words, DC charging with the method (first charging method) of charging power storage 105 by supply of external DC power EPDC at 800 V from electric power facility 320 to power storage 105 is carried out.

Whether or not it is preferable to attach charging apparatus 107 to vehicle 100 may change after the user purchases vehicle 100. The number of electric power facilities 300 (400 V) and the number of electric power facilities 320 (800 V) are different depending on a region. For example, when the user moves house, necessity for charging apparatus 107 (booster 110) may lower or increase. By way of example, in an example where booster 110 is attached to vehicle 100 in spite of presence of a large number of electric power facilities 320, booster 110 may have unnecessarily been attached to vehicle 100. Consequently, booster 110 may not effectively be used (for example, recycle and reuse of booster 110 are not promoted). On the other hand, in an example where booster 110 is not attached to vehicle 100 in spite of presence of a large number of electric power facilities 300, vehicle 100 is unable to carry out DC charging with the use of electric power facility 300 and hence convenience of the user may be compromised.

Server 200 according to this first embodiment is configured to address the problem above. Specifically, tendency information representing a tendency of external charging of vehicle 100 is stored in storage 220 of server 200. Processing apparatus 210 performs notification processing for notifying the user of vehicle 100 of recommendation for attachment or removal of booster 110 in accordance with the tendency information.

According to such a configuration, the user is motivated to attach or remove booster 110. Thus, depending on the tendency of external charging of vehicle 100, booster 110 is attached to or removed from vehicle 100. Consequently, for example, attachment of booster 110 to vehicle 100 can improve convenience of the user of vehicle 100. On the other hand, removal of booster 110 from vehicle 100 can allow effective use of removed booster 110 (for example, profits from recycling). In addition, since the weight of vehicle 100 decreases owing to removal of charging apparatus 107, electric mileage in vehicle 100 can be improved. Thus, according to the configuration, user's benefit can be ensured.

Figure 5:
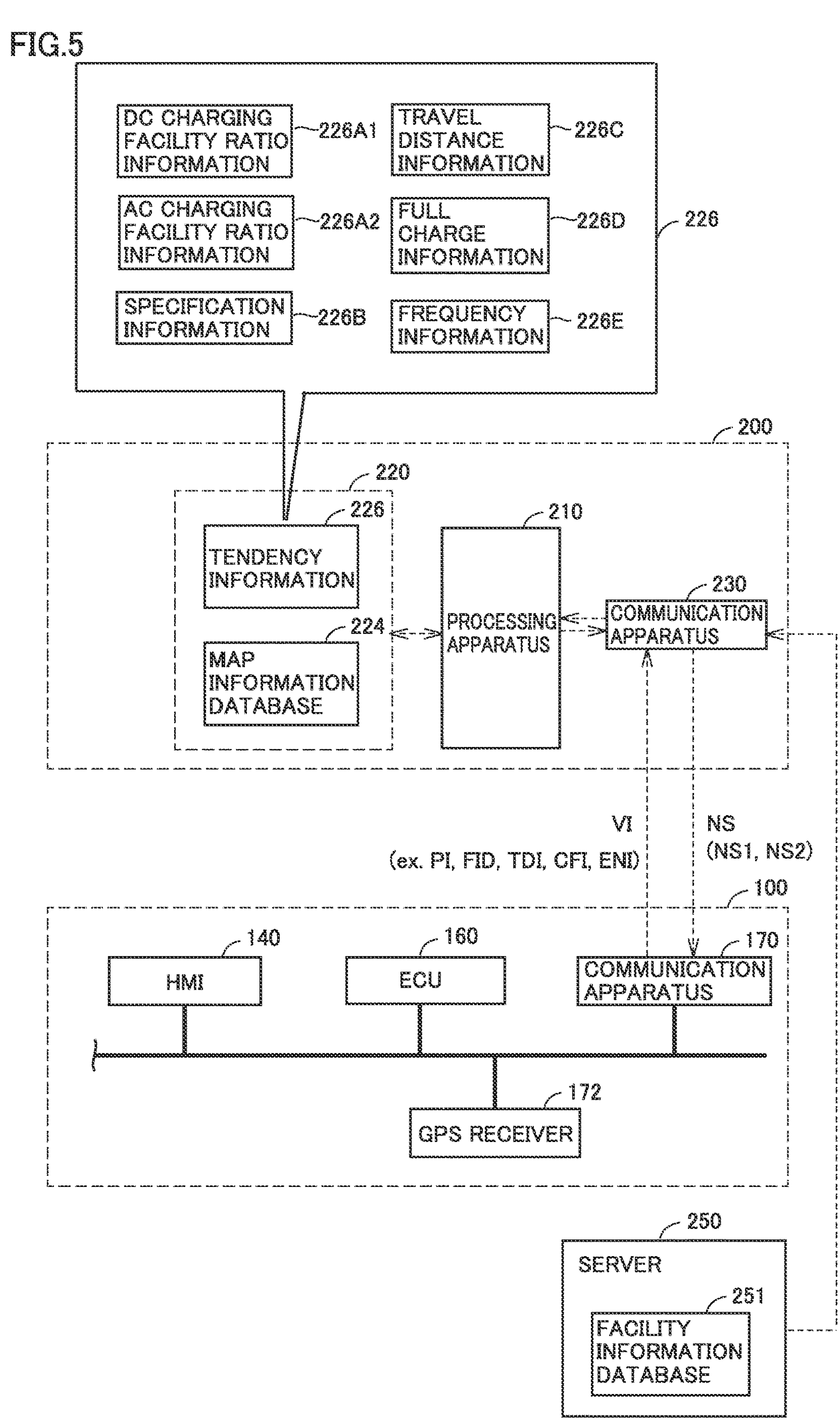
FIG. 5 is a diagram for illustrating a flow of information (a signal) and data stored in a storage of the server in the first embodiment.

FIG. 5 is a diagram for illustrating a flow of information (a signal) and data stored in storage 220 of server 200 in this first embodiment. Referring to FIG. 5, communication apparatus 230 obtains (receives) vehicle information VI from vehicle 100. Vehicle information VI includes positional information PI, a facility number FID, travel distance information TDI, charging-finish state of charge (SOC) information CFI, and attachment/non-attachment information ENI.

Positional information PI represents positional information of vehicle 100 obtained by GPS receiver 172. Facility number FID represents an identification number of the external electric power facility used by vehicle 100 for external charging. Travel distance information TDI represents a travel distance of vehicle 100. Charging-finish SOC information CFI represents an SOC at the time of end (charging-finish SOC) of external charging. Attachment/non-attachment information ENI represents whether or not charging apparatus 107 (booster 110 in this example) has been attached to vehicle 100, and it is determined by ECU 160 in accordance with attachment/non-attachment signal ES1 (FIG. 2).

A map information database 224 and tendency information 226 are stored in storage 220. Tendency information 226 is generated (updated) by processing apparatus 210 in accordance with vehicle information VI. Tendency information 226 includes DC charging facility ratio information 226A1, AC charging facility ratio information 226A2, specification information 226B, travel distance information 226C, full charge information 226D, and frequency information 226E.

DC charging facility ratio information 226A1 represents a ratio (%) of DC charging facilities to external electric power facilities within a predetermined range (a zone of living of the user in this example) including a point (a user's house in this example) determined in advance as a base of living of the user. Information representing a position of the user's house is set by the user with the use of HMI apparatus 140 in vehicle 100 and thereafter transmitted to server 200. The zone of living refers, for example, to a range where the user daily does activities with the user's house being defined as the base, and it is determined in accordance with positional information PI. AC charging facility ratio information 226A2 represents a ratio of AC charging facilities to the external electric power facilities within the zone of living of the user.

Specification information 226B represents the specification of an external electric power facility within the zone of living of the user. Specification information 226B includes information representing the number of 400V DC charging facilities (electric power facilities 300) and the number of 800V DC charging facilities (electric power facilities 320) within the zone of living of the user. DC charging facility ratio information 226A1, AC charging facility ratio information 226A2, and specification information 226B are generated in accordance with facility number FID and facility information database 251.

Travel distance information 226C represents a history of the travel distance of vehicle 100 during a most recent period and it is generated in accordance with travel distance information TDI. The most recent period refers, for example, to a period from current time until time preceding by a prescribed time period. This prescribed time period is determined in advance as appropriate (for example, three months) such that travel distance information 226C represents how frequently vehicle 100 daily travels. Full charge information 226D represents a frequency of full charge which is a frequency of charging of power storage 105 to a fully charged state during external charging, and it is generated in accordance with charging-finish SOC information CFI. Frequency information 226E represents a frequency with which external charging is carried out at a point different from the user's house (for example, outside the house), and it is generated in accordance with facility number FID and facility information database 251.

Processing apparatus 210 sets a degree of recommendation (%) indicating a degree of recommendation for attachment of booster 110 in accordance with tendency information 226, and performs previously-described notification processing in accordance with a result of setting. For example, processing apparatus 210 is configured to perform notification processing (specifically, to transmit a notification signal NS1 to vehicle 100) for recommendation for attachment of booster 110 when the degree of recommendation is equal to or higher than a prescribed threshold value (for example, 50%). On the other hand, processing apparatus 210 is configured to perform notification processing (specifically, to transmit a notification signal NS2 to vehicle 100) for recommendation for removal of booster 110 when the degree of recommendation is lower than the threshold value. When ECU 160 receives notification signal NS1, it notifies the user of recommendation for attachment of booster 110 with the use of HMI apparatus 140, and when ECU 160 receives notification signal NS2, it notifies the user of recommendation for removal of booster 110 with the use of HMI apparatus 140.

FIG. 6 is a diagram for illustrating relation between the degree of recommendation for attachment of booster 110 and tendency information 226. Referring to FIG. 6, this example shows relation between a degree of recommendation RD1 and each of DC charging facility ratio information 226A1, specification information 226B, travel distance information 226C, full charge information 226D, and frequency information 226E.

Processing apparatus 210 performs notification processing for more likely recommending attachment of booster 110 (is more likely to transmit notification signal NS1) as degree of recommendation RD1 is higher. On the other hand, processing apparatus 210 performs notification processing for more likely recommending removal of the charging apparatus (is more likely to transmit notification signal NS2) as degree of recommendation RD1 is lower.

Processing apparatus 210 sets a higher degree of recommendation RD1 as a ratio (x1) of the DC charging facilities to the external electric power facilities within the zone of living of the user is higher. On the other hand, processing apparatus 210 sets a lower degree of recommendation RD1 as the ratio (x1) is lower.

As the number (x2) of 400V DC charging facilities within the zone of living of the user is larger (in this example, the number (x3) of 800V DC charging facilities within this zone is smaller), processing apparatus 210 sets higher degree of recommendation RD1. On the other hand, as the number (x2) is smaller (in this example, the number (x3) is larger), processing apparatus 210 sets lower degree of recommendation RD1.

As a travel distance (x4) of vehicle 100 during the most recent period is longer, an amount of stored power in power storage 105 is more likely to decrease and hence necessity for external charging may be considered as being higher. Therefore, booster 110 may be attached such that DC charging can be carried out even when vehicle 100 uses electric power facility 300 (400 V). Therefore, processing apparatus 210 sets higher degree of recommendation RD1 as the travel distance (x4) is longer. On the other hand, processing apparatus 210 sets lower degree of recommendation RD1 as this distance is shorter.

The amount of stored power in power storage 105 may be considered as being more likely to decrease as a frequency (x5) of full charge is higher. Therefore, for the reason the same as above, processing apparatus 210 sets higher degree of recommendation RD1 as the frequency (x5) of full charge is higher. On the other hand, processing apparatus 210 sets lower degree of recommendation RD1 as this frequency (x5) is lower.

In this example, it is assumed that the DC charging facility is less likely to be provided in the user's house than the AC charging facility. Therefore, as a frequency (x6) with which external charging is carried out in the house is higher (that is, a frequency (x7) with which external charging is carried out at a point different from the house is lower), processing apparatus 210 sets lower degree of recommendation RD1. On the other hand, processing apparatus 210 sets higher degree of recommendation RD1 as the frequency (x6) is lower (that is, the frequency (x7) is higher).

Figure 7:
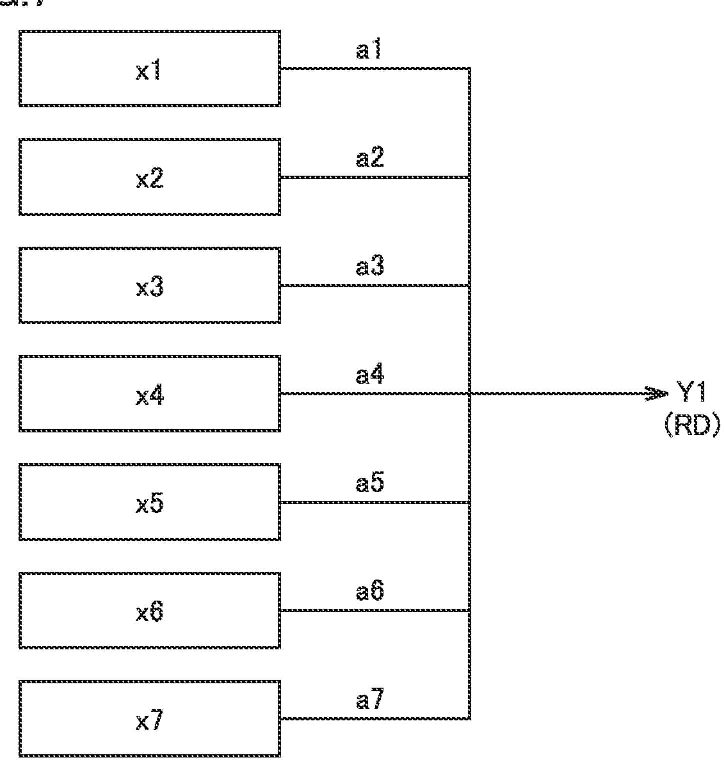
FIG. 7 is a diagram showing an exemplary method for calculating a setting value of the degree of recommendation.

FIG. 7 is a diagram showing an exemplary method for calculating a setting value of degree of recommendation RD1. Referring to FIG. 7, processing apparatus 210 calculates a value (Y1) of degree of recommendation RD1 with multiple regression analysis based on x1 to x7 (FIG. 6) as parameters included in tendency information 226 and coefficients a1 to a7. Coefficients a1 to a7 are determined by a known statistical method in multiple regression analysis.

FIG. 8 is a flowchart showing exemplary processing performed by server 200 according to this first embodiment. Processing in this flowchart is started when server 200 obtains (receives) vehicle information VI. In the description below, FIGS. 5 to 7 are referred to as appropriate.

Referring to FIG. 8, server 200 generates (updates) tendency information 226 in storage 220 in accordance with vehicle information VI (step S110). Then, server 200 sets degree of recommendation RD1 in accordance with tendency information 226 (step S120). In this example, server 200 calculates a setting value Y1 of degree of recommendation RD1.

Then, server 200 determines whether or not booster 110 has already been attached to vehicle 100 in accordance with attachment/non-attachment information ENI (step S125). When booster 110 has already been attached to vehicle 100 (YES in step S125), the process proceeds to step S130. On the other hand, when booster 110 has not been attached to vehicle 100 (NO in step S125), the process proceeds to step S140.

In step S130, server 200 branches the processing in accordance with whether or not degree of recommendation RD1 (Y1) is equal to or higher than a threshold value. When degree of recommendation RD1 is equal to or higher than the threshold value (YES in step S130), the process ends. On the other hand, when degree of recommendation RD1 is lower than the threshold value (NO in step S130), server 200 performs notification processing for recommendation for removal of booster 110 (step S138) and thereafter the process ends.

In step S140, server 200 branches the processing in accordance with whether or not degree of recommendation RD1 is equal to or higher than the threshold value. When degree of recommendation RD1 is lower than the threshold value (NO in step S140), the process ends. On the other hand, when degree of recommendation RD1 is equal to or higher than the threshold value (YES in step S140), server 200 performs notification processing for recommendation for attachment of booster 110 (step S148) and thereafter the process ends.

As set forth above, according to this first embodiment, a vehicle-mounted DC charging system suitable for the user of vehicle 100 can be proposed to the user. Consequently, charging apparatus 107 (for example, booster 110) can appropriately be attached or removed.

Second Embodiment

In this second embodiment, an AC-DC conversion device instead of booster 110 is employed as charging apparatus 107. This AC-DC conversion device is used for AC charging.

Figure 9:
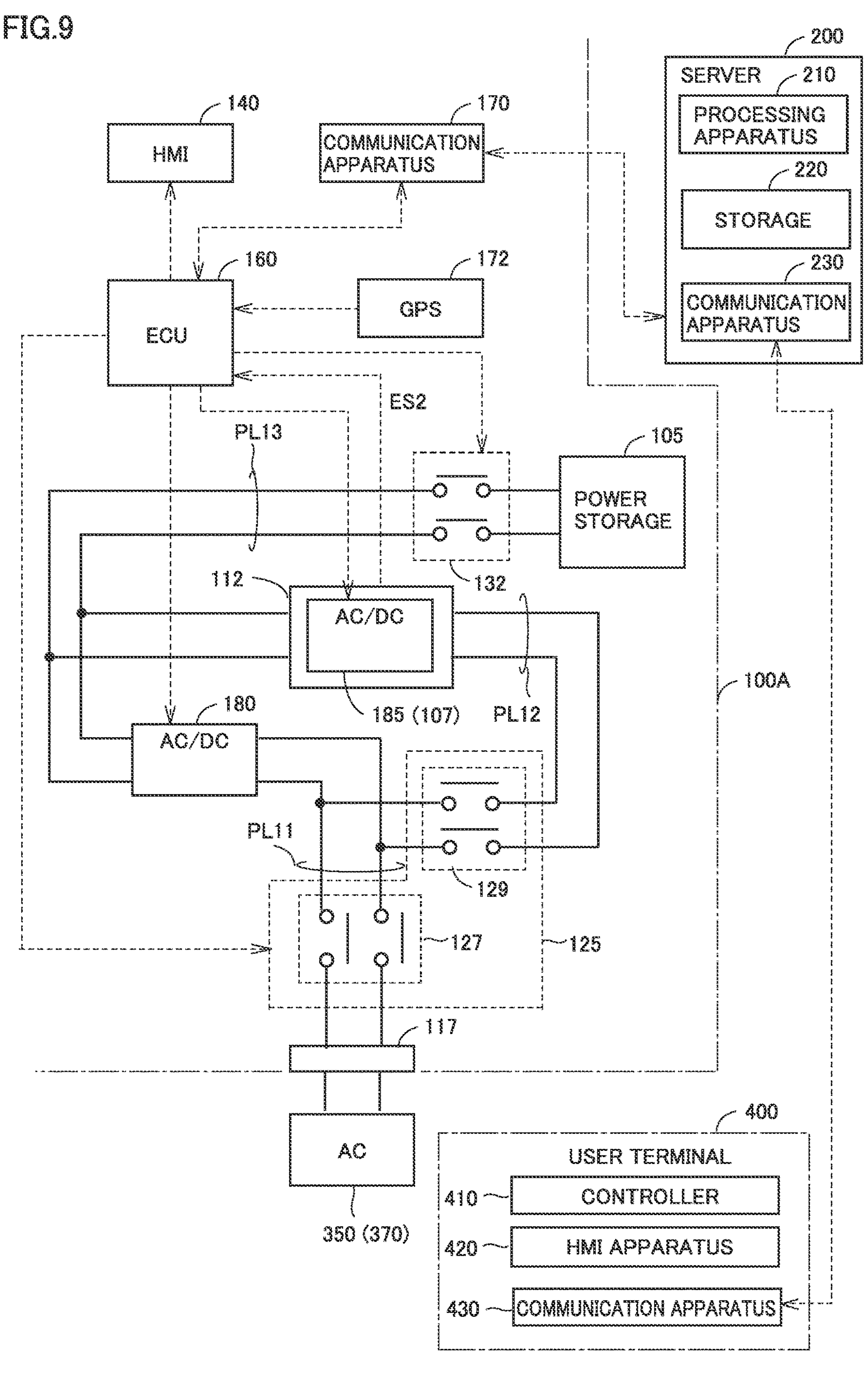
FIG. 9 is a diagram showing a detailed configuration of a vehicle in a second embodiment.

FIG. 9 is a diagram showing a detailed configuration of a vehicle in the second embodiment. Referring to FIG. 9, an AC-DC conversion device 185 as charging apparatus 107 is attached to a vehicle 100A, and vehicle 100A is employed instead of vehicle 100.

Electric power facilities 350 and 370 are external electric power facilities (AC charging facilities) configured to supply external AC power of magnitude of 11 kw and 22 kw to vehicle 100A, respectively.

Vehicle 100A includes an AC-DC conversion device 180, an interface 112, an AC inlet 117, a relay unit 125, and an SMR 132 in addition to AC-DC conversion device 185.

AC-DC conversion device 180 is configured to convert AC power of external AC power that is supplied from electric power facility 350 or electric power facility 370 through a power line PL11 to AC-DC conversion device 180 and to supply resultant DC power to power storage 105. AC-DC conversion device 185 is configured to convert AC power of external AC power that is supplied from electric power facility 370 through a power line PL12 to AC-DC conversion device 185 and to supply resultant DC power to power storage 105.

Interface 112 is a member to which AC-DC conversion device 185 is attached in vehicle 100A. Interface 112 transmits an attachment/non-attachment signal ES2 indicating whether or not AC-DC conversion device 185 has been attached to ECU 160. Attachment/non-attachment signal ES2 is used for generation of attachment/non-attachment information ENI (FIG. 5). AC inlet 117 is configured to receive external AC power supplied from the AC charging facility such as electric power facilities 350 and 370. Relay unit 125 includes charging relays 127 and 129. SMR 132 is provided between power storage 105 and a power line PL13.

Power storage 105, AC-DC conversion device 180, relay unit 125, and SMR 132 implement the vehicle-mounted charging system for AC charging at 11 kw. These components and AC-DC conversion device 185 implement the vehicle-mounted charging system for AC charging at 22 kw.

In this second embodiment, the first charging method is a method of charging power storage 105 by activation of first AC-DC conversion device 180 of AC-DC conversion devices 180 and 185 in an example where external AC power is electric power at 11 kw. The second charging method is a method of charging power storage 105 by activation of both of AC-DC conversion devices 180 and 185 in an example where external AC power is electric power at 22 kw.

Figure 10:
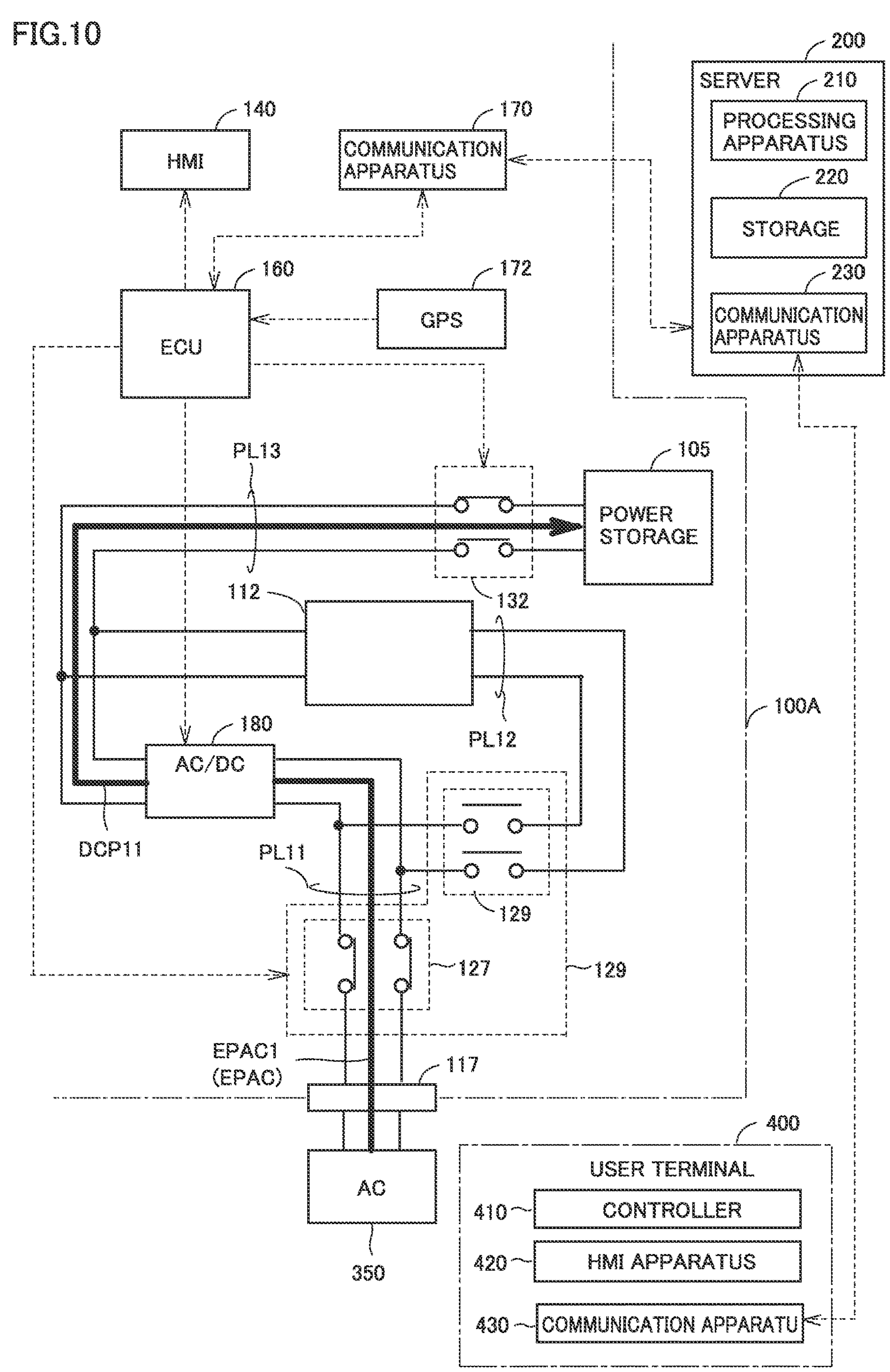
FIG. 10 is a diagram showing a flow of electric power in an example where an AC-DC conversion device is not attached to the vehicle and AC charging with the use of an electric power facility (11 kw) is carried out.

FIG. 10 is a diagram showing a flow of electric power in an example where AC-DC conversion device 185 is not attached to vehicle 100A and AC charging with the use of electric power facility 350 (11 kw) is carried out. Referring to FIG. 10, in this example, AC-DC conversion device 180 operates to convert external AC power EPAC at 11 kw (EPAC1) into DC power DCP11 to charge power storage 105 with DC power DCP11.

Figure 11:
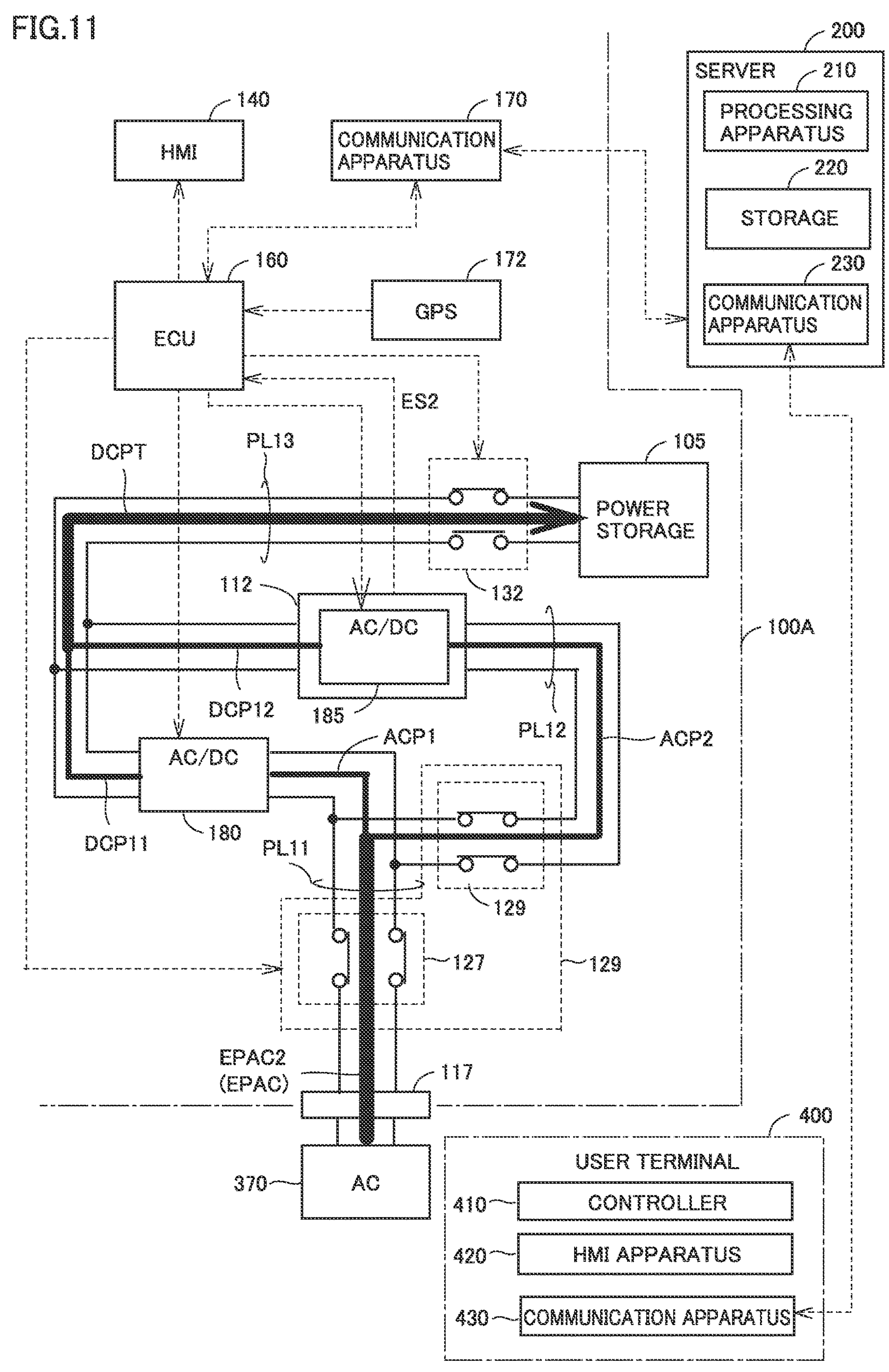
FIG. 11 is a diagram showing a flow of electric power in an example where an AC-DC conversion device is attached to the vehicle and AC charging with the use of an electric power facility (22 kw) is carried out.

FIG. 11 is a diagram showing a flow of electric power in an example where AC-DC conversion device 185 is attached to vehicle 100A and AC charging with the use of electric power facility 370 (22 kw) is carried out. Referring to FIG. 11, external AC power EPAC at 22 kw (EPAC2) is divided into AC power ACP1 and AC power ACP2. Magnitude of AC power ACP1 and ACP2 is each 11 kw (=22 kw/2).

AC-DC conversion device 180 operates to convert AC power ACP1 into DC power DCP11 and to supply DC power DCP11 to power storage 105. AC-DC conversion device 185 converts AC power ACP2 into DC power DCP12 and to supply DC power DCP12 to power storage 105. DC power DCPT (obtained by superimposition of DC power DCP11 and DCP12 on each other) is thus supplied to power storage 105. Consequently, a charging rate can be higher (a time period for charging can be shorter) than in an example of AC charging at 11 kw (first charging method) (FIG. 10).

Referring again to FIG. 5, in this second embodiment, specification information 226B includes information representing the specification of AC charging facilities within the zone of living of the user. This specification represents magnitude of external AC power. Specification information 226B includes information representing the number of 11 kw AC charging facilities (electric power facilities 350) and the number of 22 kw AC charging facilities (electric power facilities 370) within the zone of living of the user.

FIG. 12 is a diagram for illustrating relation between a degree of recommendation for attachment of AC-DC conversion device 185 and tendency information 226. Referring to FIG. 12, a degree of recommendation RD2 represents a degree of recommendation for attachment of AC-DC conversion device 185. This example shows relation between degree of recommendation RD2 and each of AC charging facility ratio information 226A2, specification information 226B, travel distance information 226C, full charge information 226D, and frequency information 226E.

Processing apparatus 210 performs notification processing for more likely recommending attachment of AC-DC conversion device 185 as degree of recommendation RD2 is higher. On the other hand, processing apparatus 210 performs notification processing for more likely recommending removal of AC-DC conversion device 185 as degree of recommendation RD2 is lower.

As a ratio (x11) of AC charging facilities to the external electric power facilities within the zone of living of the user of vehicle 100A is higher, processing apparatus 210 sets higher degree of recommendation RD2. On the other hand, as the ratio (x11) is lower, processing apparatus 210 sets lower degree of recommendation RD2.

As the number (x12) of 11 kw AC charging facilities within the zone of living of the user is larger (in this example, the number (x13) of 22 kw AC charging facilities within this zone is smaller), processing apparatus 210 sets lower degree of recommendation RD2. On the other hand, as the number (x12) is smaller (the number (x13) is larger), processing apparatus 210 sets higher degree of recommendation RD2.

As the travel distance (x4) of vehicle 100A during the most recent period is longer, an amount of stored power in power storage 105 is more likely to decrease and hence necessity for external charging may be considered as being higher. Therefore, AC-DC conversion device 185 may be attached such that AC charging can be carried out even when vehicle 100A uses electric power facility 370 (22 kw). Therefore, processing apparatus 210 sets higher degree of recommendation RD2 as the travel distance (x4) is longer. On the other hand, processing apparatus 210 sets lower degree of recommendation RD2 as this distance is shorter.

The amount of stored power in power storage 105 may be considered as being more likely to decrease as the frequency (x5) of full charge is higher. Therefore, for the reason the same as above, processing apparatus 210 sets higher degree of recommendation RD2 as the frequency (x5) of full charge is higher. On the other hand, processing apparatus 210 sets lower degree of recommendation RD2 as this frequency (x5) is lower.

In this example, it is assumed that electric power facility 370 (22 kw) is less likely to be provided in the user's house than electric power facility 350 (11 kw). Therefore, as the frequency (x6) with which external charging is carried out in the house is higher (that is, the frequency (x7) with which external charging is carried out at a point different from the house is lower), processing apparatus 210 sets lower degree of recommendation RD2. On the other hand, processing apparatus 210 sets higher degree of recommendation RD2 as the frequency (x6) is lower (that is, the frequency (x7) is higher).

FIG. 13 is a flowchart showing exemplary processing performed by server 200 according to this second embodiment. Referring to FIG. 13, this flowchart is different from the flowchart in the first embodiment (FIG. 8) in that AC-DC conversion device 185 is used instead of booster 110 and degree of recommendation RD2 is used instead of degree of recommendation RD1, however, it is otherwise similar; processing in steps S210 to S248 is similar to the processing in steps S110 to S148. Therefore, detailed description will not be repeated.

As set forth above, according to this second embodiment, a vehicle-mounted AC charging system suitable for the user of vehicle 100A can be proposed to the user.

First Modification

Tendency information 226 (FIG. 5) may further include activity area information representing an area of activities of the user of vehicle 100 (100A).

Figures 14, 15:
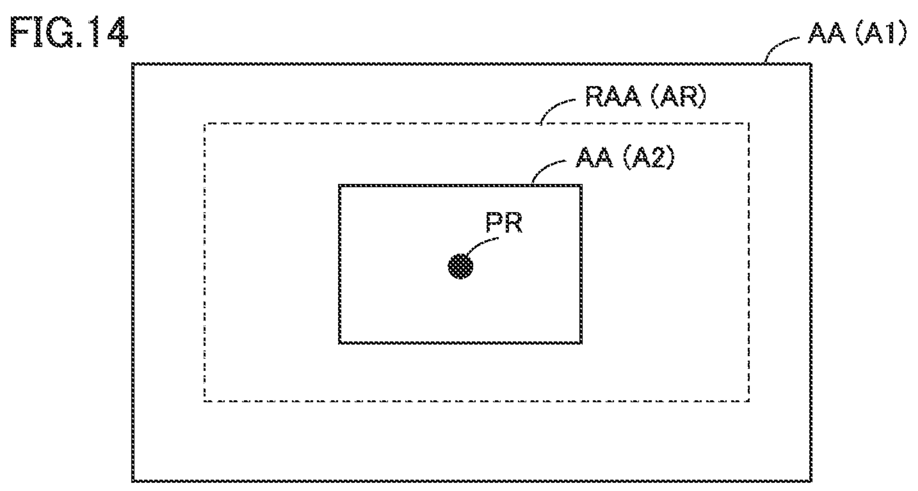
FIG. 14 is a diagram for illustrating how the server according to a first modification sets the degree of recommendation.
FIG. 15 is a diagram showing a configuration of an information processing system including the server according to a second modification.

FIG. 14 is a diagram for illustrating how server 200 according to this first modification sets degree of recommendation RD1 (RD2). Referring to FIG. 14, a point PR refers to a point (in this example, the user's house) determined in advance as the base of living of the user. An area of activities AA is determined as an area where the user does activities in his/her daily life. Server 200 makes determination as to area of activities AA with the use of an image recognition technique in accordance with positional information PI (FIG. 5) and map information database 224.

As area of activities AA is larger, the amount of stored power in power storage 105 may tend to run out and the frequency with which external charging is carried out may be higher. Then, server 200 performs notification processing for more likely recommending attachment of charging apparatus 107 as area of activities AA of the user is larger. For example, when area of activities AA has an area A1 larger than an area (AR) of a prescribed reference area of activities RAA, server 200 performs notification processing for recommending attachment of charging apparatus 107.

On the other hand, server 200 performs notification processing for more likely recommending removal of charging apparatus 107 as area of activities AA of the user is smaller. For example, when area of activities AA has an area A2 smaller than AR, server 200 performs notification processing for recommending removal of charging apparatus 107.

Second Modification

FIG. 15 is a diagram showing a configuration of an information processing system including the server according to this second modification. Referring to FIG. 15, an information processing system 10A is different from information processing system 10 (FIG. 1) in including a vehicle group 1000 (a plurality of vehicles 100).

In this second modification, server 200 sets degree of recommendation RD1 of a subject vehicle 100*t* included in vehicle group 1000 by Bayesian inference. Server 200 assumes in advance ratios to all of the plurality of vehicles 100, of vehicles 100 to which attachment of charging apparatus 107 (in this example, booster 110) is recommended and of vehicles 100 to which removal of charging apparatus 107 is recommended. This ratio is stored in storage 220 as prior probability in Bayesian inference.

Figure 16:
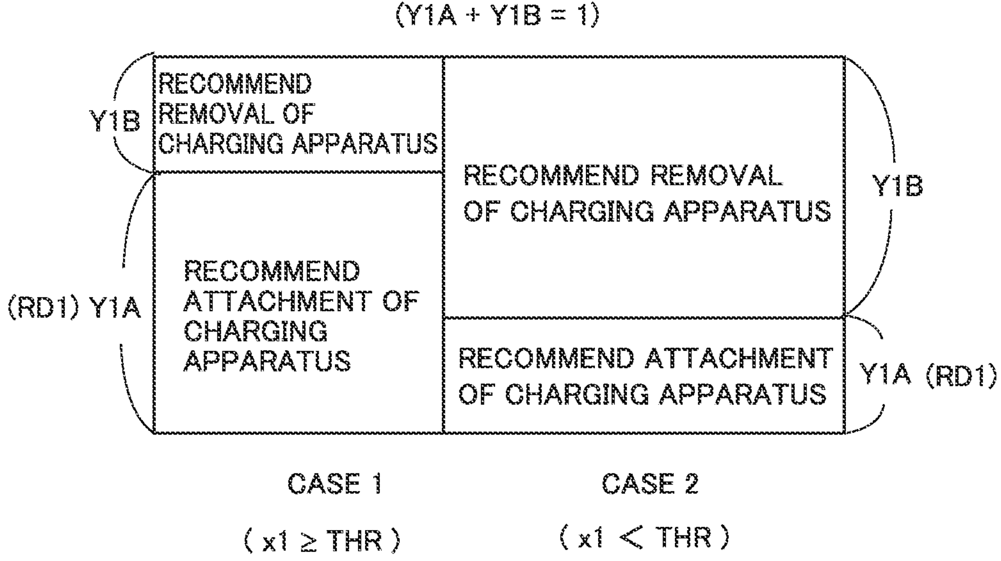
FIG. 16 is a diagram for illustrating how the server according to the second modification sets the degree of recommendation.

FIG. 16 is a diagram for illustrating how server 200 according to this second modification sets degree of recommendation RD1 (RD2). Referring to FIG. 16, in this example, whether or not to recommend attachment of charging apparatus 107 is assumed as an event to be inferred. The ratio (x1) of DC charging facilities within the zone of living of the user being equal to or higher than a threshold ratio THR or being lower than this ratio is assumed as an event to be observed. Probabilities of recommendation to subject vehicle 100*t*, of attachment and removal of charging apparatus 107 after occurrence of the event to be observed (posterior probabilities) are expressed as Y1A and Y1B, respectively.

Server 200 determines whether or not the ratio (x1) in connection with subject vehicle 100*t* is equal to or higher than threshold ratio THR and carries out Bayesian inference in accordance with a result of this determination and the prior probability. The posterior probabilities (Y1A and Y1B) are thus calculated as degree of recommendation RD1. When Y1A is higher than Y1B (a case 1), attachment of booster 110 is recommended. On the other hand, when Y1B is higher than Y1A (a case 2), removal of booster 110 is recommended to subject vehicle 100*t*.

Third Modification

Whether or not to recommend attachment or removal of charging apparatus 107 in subject vehicle 100*t* (FIG. 15) may be determined with the use of a trained model below.

Figure 17:
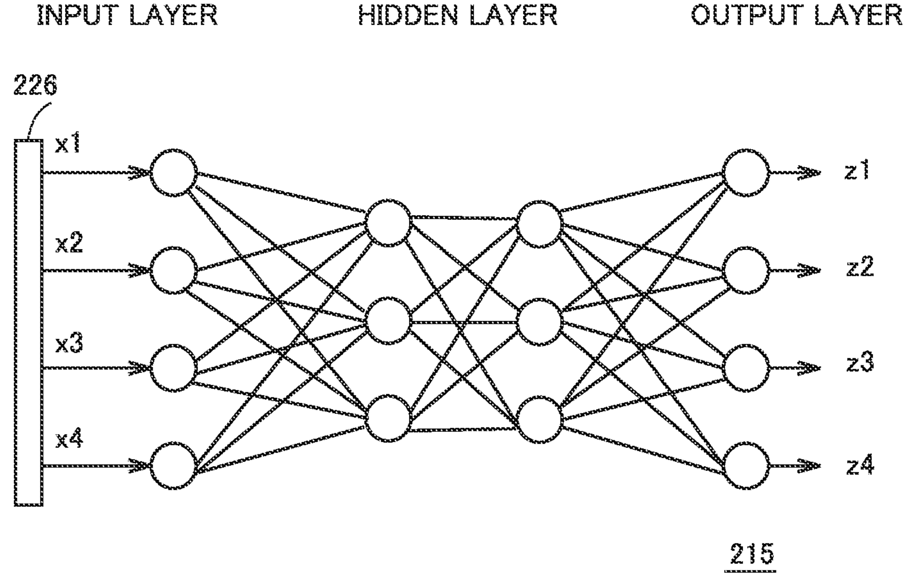
FIG. 17 is a diagram for illustrating a trained model used in a third modification.

FIG. 17 is a diagram for illustrating a trained model used in this third modification. Referring to FIG. 17, a trained model 215 is a model using, for example, deep learning, and it is stored in storage 220 of server 200.

Trained model 215 is a model trained with relation with total tendency information and total frequency information. The total tendency information represents tendency information 226 of a plurality of vehicles 100. The total frequency information represents a total frequency which is a frequency with which external charging is carried out with the second charging method in the plurality of vehicles 100 (vehicle group 1000).

Input parameters to trained model 215 include x1 to x4 (FIG. 6) for each of the plurality of vehicles 100 but may include x11 to x13 (FIG. 12). Output parameters from trained model 215 include z1 to z4. In this example, z1 and z2 represent probabilities of recommendation for attachment and removal of booster 110, respectively. z3 and z4 represent probabilities of recommendation for attachment and removal of AC-DC conversion device 185, respectively.

Server 200 performs determination processing for determining whether or not to recommend attachment or removal of charging apparatus 107 in subject vehicle 100*t* in accordance with tendency information 226 of subject vehicle 100*t*, with the use of trained model 215. Subject vehicle 100*t* is vehicle 100 (100A) to be subjected to this determination processing. In this example, server 200 performs the determination processing in accordance with the highest output parameter (or an output parameter higher than a prescribed value (for example, 50%)) among z1 to z4 and performs previously-described notification processing for notifying the user of subject vehicle 100*t* in accordance with a result of this determination processing.

For example, when z1 is highest (or higher than 50%), server 200 performs notification processing for notifying the user of subject vehicle 100*t* of recommendation for attachment of booster 110. When z2 is highest, server 200 may perform the notification processing for notifying the user of subject vehicle 100*t* of recommendation for removal of booster 110.

Fourth Modification

Figure 18:
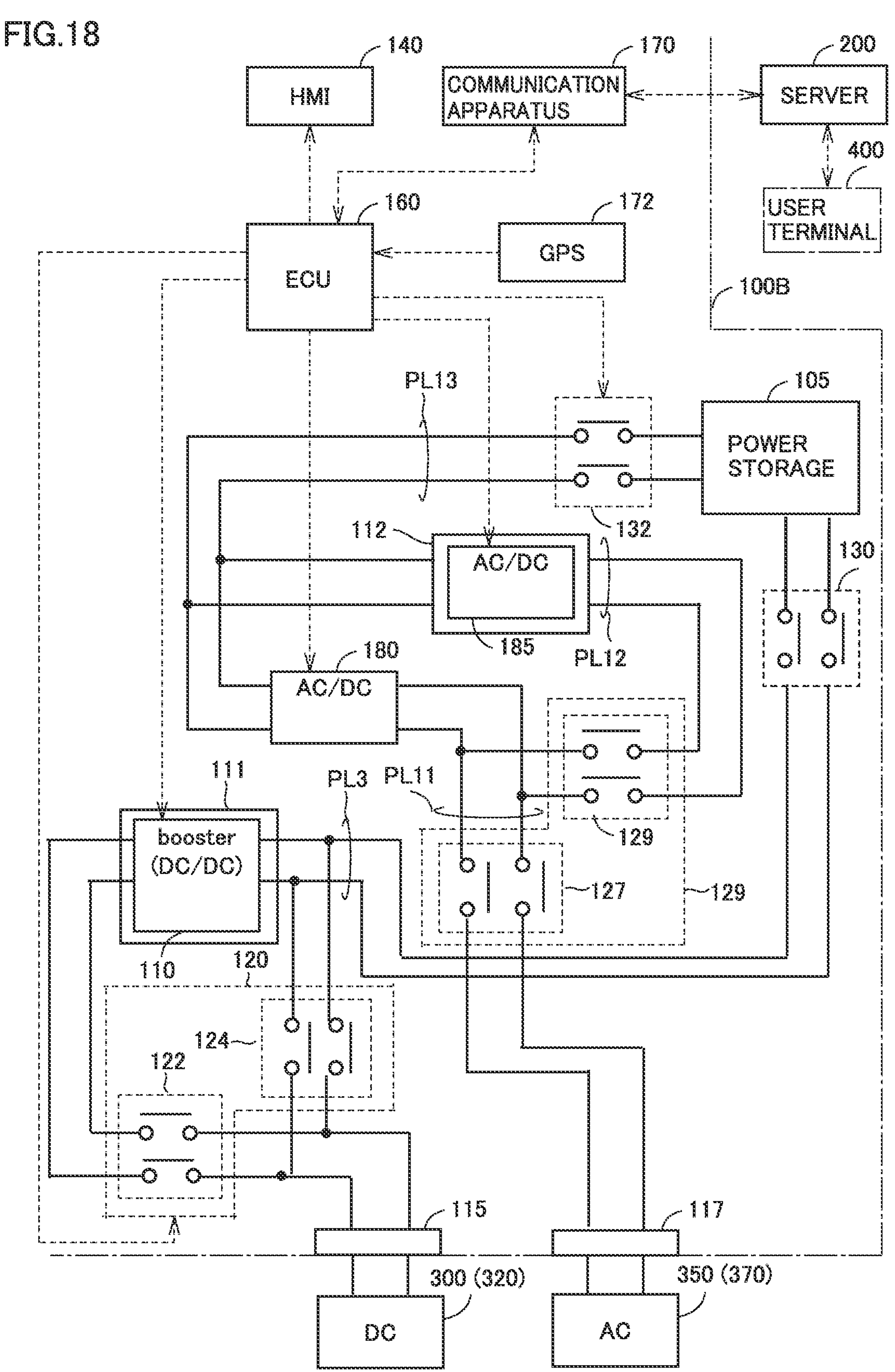
FIG. 18 is a diagram showing a detailed configuration of a vehicle in another modification.

FIG. 18 is a diagram showing a detailed configuration of a vehicle in this modification. Referring to FIG. 18, a vehicle 100B is configured such that both of booster 110 and AC-DC conversion device 185 can be attached thereto.

For example, when neither of booster 110 and AC-DC conversion device 185 is attached to vehicle 100B and both of degrees of recommendation RD1 and RD2 are equal to or higher than the threshold value, server 200 performs notification processing for notifying a user of vehicle 100B of recommendation for attachment of both of booster 110 and AC-DC conversion device 185. When both of booster 110 and AC-DC conversion device 185 have been attached to vehicle 100B and both of degrees of recommendation RD1 and RD2 are lower than the threshold value, server 200 may perform the notification processing for notifying the user of vehicle 100B of recommendation for removal of both of booster 110 and AC-DC conversion device 185.

Another Modification

Processing apparatus 210 may transmit notification signals NS1 and NS2 to user terminal 400 instead of vehicle 100. When user terminal 400 receives this notification signal, it notifies the user of recommendation for attachment or removal of charging apparatus 107 with the use of HMI apparatus 420.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A server configured to notify a user of a vehicle that carries out external charging for charging a vehicle-mounted power storage with external electric power supplied from an electric power facility outside the vehicle, the vehicle being configured such that a removable charging apparatus can be attached to the vehicle, a method of the external charging including a first charging method and a second charging method different from the first charging method, the first charging method being the method of external charging carried out while the charging apparatus is not attached to the vehicle, the second charging method being the method of external charging carried out by activation of the charging apparatus while the charging apparatus is attached to the vehicle, the server comprising:

a processing apparatus; and a storage where tendency information representing a tendency of the external charging is stored, wherein the processing apparatus performs notification processing for notifying the user of recommendation for attachment or removal of the charging apparatus in accordance with the tendency information, wherein the external electric power is external DC power as DC power supplied from the electric power facility to the vehicle, the charging apparatus is a booster configured to boost, when a voltage of the external DC power is a first voltage, the first voltage and to supply DC power at a second voltage which is a boosted voltage to the vehicle-mounted power storage, and the first charging method includes a method of charging the vehicle-mounted power storage by supplying the external DC power at the second voltage from the electric power facility to the vehicle-mounted power storage when the voltage of the external DC power is the second voltage, wherein the tendency information includes information representing a number of prescribed DC charging facilities within a predetermined range including a base of living of the user, the prescribed DC charging facilities are each the electric power facility configured to supply the external DC power at the second voltage to the vehicle, and the processing apparatus performs the notification processing for more likely recommending attachment of the booster as the number of prescribed DC charging facilities is smaller, and performs the notification processing for more likely recommending removal of the booster as the number of prescribed DC charging facilities is larger.

2. A server configured to notify a user of a vehicle that carries out external charging for charging a vehicle-mounted power storage with external electric power supplied from an electric power facility outside the vehicle, the vehicle being configured such that a removable charging apparatus can be attached to the vehicle, a method of the external charging including a first charging method and a second charging method different from the first charging method, the first charging method being the method of external charging carried out while the charging apparatus is not attached to the vehicle, the second charging method being the method of external charging carried out by activation of the charging apparatus while the charging apparatus is attached to the vehicle, the server comprising:

a processing apparatus; and a storage where tendency information representing a tendency of the external charging is stored, wherein the processing apparatus performs notification processing for notifying the user of recommendation for attachment or removal of the charging apparatus in accordance with the tendency information, wherein the external electric power is external AC power as AC power supplied from the electric power facility to the vehicle, the vehicle includes a first AC-DC conversion device for carrying out the external charging with the external AC power, the charging apparatus is a second AC-DC conversion device different from the first AC-DC conversion device, the first charging method includes a method of charging the vehicle-mounted power storage by activation of the first AC-DC conversion device when the external AC power is first electric power, and the second charging method includes a method of charging the vehicle-mounted power storage by activation of both of the first AC-DC conversion device and the second AC-DC conversion device when the external AC power is second electric power greater than the first electric power, wherein the tendency information includes information representing a number of prescribed AC charging facilities within a predetermined range including a base of living of the user, the prescribed AC charging facilities are each the electric power facility configured to supply the external AC power at the second electric power to the vehicle, and the processing apparatus performs the notification processing for more likely recommending attachment of the second AC-DC conversion device as the number of prescribed AC charging facilities is larger, and performs the notification processing for more likely recommending removal of the second AC-DC conversion device as the number of prescribed AC charging facilities is smaller.

* * * * *